United States Patent
Shah

(12) 
(10) Patent No.: US 6,629,670 B1
(45) Date of Patent: Oct. 7, 2003

(54) VTOL AIRCRAFT WITH ANGLED THRUSTERS

(76) Inventor: Mrugesh K. Shah, 403 Trails Ct., Houston, TX (US) 77024

( * ) Notice: Subject to any disclaimer, the term of this patent is extended or adjusted under 35 U.S.C. 154(b) by 0 days.

(21) Appl. No.: 10/107,011

(22) Filed: Mar. 28, 2002

(51) Int. Cl.$^7$ .................................................. B64C 1/04
(52) U.S. Cl. ........................ 244/12.3; 244/23 B; 244/52
(58) Field of Search ................. 244/12.1, 12.2, 244/12.3, 12.4, 12.5, 23 R, 23 A, 23 B, 52

(56) References Cited

U.S. PATENT DOCUMENTS

| | | | |
|---|---|---|---|
| 1,571,647 A | * | 2/1926 | Santarsiero ................. 244/12.1 |
| 2,885,159 A | | 5/1959 | Ashwood |
| 2,936,969 A | * | 5/1960 | Griffith et al. .............. 244/12.3 |
| 2,990,138 A | * | 6/1961 | Shah ......................... 244/12.3 |
| 3,030,051 A | | 4/1962 | Kerry et al. |
| 3,035,790 A | * | 5/1962 | Leibach ...................... 244/12.3 |
| 3,065,928 A | | 11/1962 | Dornier |
| 3,106,372 A | * | 10/1963 | Kutney ................... 244/110 B |
| 3,117,643 A | * | 1/1964 | Cockerell .................. 244/23 R |
| 3,135,480 A | * | 6/1964 | Chaplin, Jr. ................ 244/12.1 |
| 3,278,138 A | | 10/1966 | Haberkorn |
| 3,545,219 A | | 12/1970 | Millward |
| 3,823,897 A | | 7/1974 | Bloomquist |
| 4,193,569 A | * | 3/1980 | Nichols ................... 244/110 B |
| 5,275,356 A | | 1/1994 | Bollinger et al. |
| 5,372,337 A | | 12/1994 | Kress et al. |
| 6,254,032 B1 | * | 7/2001 | Bucher ...................... 244/12.2 |

\* cited by examiner

*Primary Examiner*—Galen L. Barefoot
(74) *Attorney, Agent, or Firm*—Harrison & Egbert

(57) ABSTRACT

A VTOL aircraft having a fuselage, a first wing extending from one side of the fuselage, a second wing extending from an opposite side of the fuselage, a first thruster supported on the first wing, a second thruster supported on the second wing and a propulsion system connected to the fuselage. The first thruster serves to direct a thrust of air at an angle toward an area directly below the fuselage. The second thruster is angularly directed so as to direct the thrust of air at an angle toward the area directly below the fuselage. The propulsion system serves to propel the fuselage through the air. Each of the thrusters is a jet engine. Each of the thrusters can be angularly moveable between a vertical position and an acute angle with respect to a plane of the wings.

15 Claims, 2 Drawing Sheets

VTOL AIRCRAFT WITH ANGLED THRUSTERS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to VTOL aircraft. More particularly, the present invention relates wing-mounted thrusters that can be angularly manipulated so as to generate an angular thrust below the fuselage of the aircraft.

BACKGROUND OF THE INVENTION

Conventional VTOL aircraft employ a number of structural relationships for effecting sufficient vertical thrust for take-off and landing and the direction of control required during these operations. For example, one type of aircraft includes a plurality of separate thrust engines moveable between vertical and horizontal thrust positions. Take-off is accomplished by tipping the engines to a vertical position, and thereafter moving them to a horizontal position for forward flight. In another design, the engine thrust is deflected vertically downwardly from the aircraft's center of gravity with part of the thrust drawn off into the wing tip jets to provide attitude control at low forward speeds.

Unfortunately, major efforts associated with VTOL aircraft have been directed to techniques for the "take-off" of the aircraft. Very little effort has been conducted into the most efficient manner in which to use the thrusters of the airplane to effectively land the aircraft.

In the past, various patents have issued with respect to such vertical take-off and landing aircraft. For example, U.S. Pat. No. 3,030,051, issued on Apr. 17, 1962 to Kerry et al. describes a vertical lift engine for aircraft. This vertical lift engine is mounted so that the engine can be moved between a horizontal and a vertical position. A guide vane structure serves to deflect ambient air into the engine air intake. A means is provided for controlling the movement of the engine from the horizontal toward the vertical position.

U.S. Pat No. 3,545,219, issued on Dec. 8, 1970 to J. Millward, describes a gas turbine by-pass engine mounted in the wing structure of the aircraft. In this invention, the by-pass engine has a fixed nozzle directable downwardly from the wing structure of the aircraft and deflectors for deflecting the exhaust gases in a desired direction.

U.S. Pat No. 2,885,159, issued on May 5, 1959 to T. F. Ashwood, describes an aircraft having orientatable jet nozzle arrangements. The jet gases can be directed in an orientation generally aligned with the longitudinal axis of the aircraft or directed downwardly so as to facilitate the take-off of the aircraft.

U.S. Pat. No. 3,278,138, issued on Oct. 11, 1966 to E. Haberkorn, teaches a take-off assist for a VTOL aircraft. In this device, a thruster is provided which is mounted to the fuselage of the aircraft. This thruster structure is angularly adjustable so as to direct a downward thrust to the sides of the fuselage or a rearward thrust toward the back of the fuselage.

U.S. Pat No. 3,823,897, issued on Jul. 16, 1974 to O. E. Bloomquist, describes a VTOL aircraft having a single source of thrust acting through a plurality of reaction nozzles displaced from various axes of the aircraft so as to provide the functions of lift, thrust and attitude control. The nozzles are infinitely variable so as to generate thrust in the desired direction. A bypass valve permits the thrust engine or engines to operate at full power during lift-off and landing.

U.S. Pat No. 5,372,337, issued on Dec. 13, 1994 to Kress et al., describes an unmanned aircraft having a single engine with dual jet exhaust. These exhaust are coupled to side mounted rotating nozzles through a swivel joint. Jet deflection means are mounted to the end of the rotating nozzles so as to achieve additional degrees of freedom for the aircraft.

It is an object of the present invention to provide a VTOL aircraft with superior landing capability.

It is another object of the present invention to provide a VTOL aircraft in which the thrust is directed to an area directly below the underside of the fuselage.

It is another object of the present invention to provide a VTOL aircraft which includes wing-mounted jet engines which can direct an angularly adjustable force for the purposes of take-off and landing.

It is still a further object of the present invention to provide a VTOL aircraft which better simulates the take-off and landing characteristics of a bird.

These and other objects and advantages of the present invention will become apparent from a reading of the attached specification and appended claims.

BRIEF SUMMARY OF THE INVENTION

The present invention is a VTOL aircraft comprising a fuselage, a first wing extending from one side of the fuselage, a second wing extending from an opposite side of the fuselage, a first thruster means supported on the first wing, a second thruster means supported on the second wing, and a propulsion means connected to the fuselage. The first thruster means serves to direct a thrust of air at an angle directly below the fuselage. The second thruster means also serves to direct a thrust of air at an angle toward the area directly below the fuselage. The propulsion means serves to generate thrust so as to propel the fuselage through the air.

The first and second thruster means are each directed at an acute angle with respect to a plane of the first and second wings . In the preferred embodiment of the present invention, these thruster means are jet engines. Each of these jet engines has a selectable amount of thrust. The thrusters are angularly moveable between a first position and a second position. The first position is directed to the area directly below the fuselage. The second position is transverse to a plane of the first and second wings. The propulsion means is a pair of jet engines that are mounted on opposite sides of the fuselage.

The present invention also comprises control means contained within the fuselage. The control means is connected to the first and second thruster means. The control means serves to control an amount of the thrust produced by the first and second thruster means.

The present invention is also a method of landing an aircraft comprising the steps of: (1) flying the aircraft toward a surface of the earth; (2) directing a downward thrust from a pair of wings of the aircraft toward the earth at an area directly below the fuselage of the aircraft; (3) reducing a force of the downward thrust as the aircraft approaches the earth; and (4) stopping the downward thrust when the wheels of the aircraft touch the earth.

DETAILED DESCRIPTION OF THE INVENTION

Figure 1:
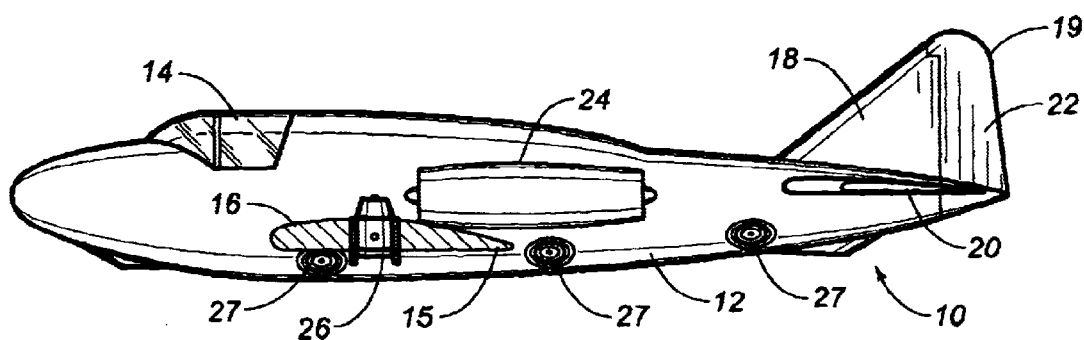
FIG. 1 is a side elevational view of the VTOL aircraft in accordance with the present invention.

Referring to FIG. 1, there is shown at 10 the vertical take-off and landing (VTOL) aircraft employing the structure of the present invention. Aircraft 10 is generally conventional in nature, including a fuselage 12, a cockpit 14, wings 16, with ailerons 15, a vertical tail member or fin 18, having a rudder 19 and a horizontal tail member 20 having elevators 22. The ailerons 15, rudders 17 and elevators 19 are used in the conventional manner to control the attitude of the aircraft 10, i.e. turning movement about a vertical axis (yaw), up-and-down movement about a transverse horizontal axis (pitch) and rolling movement about a longitudinal axis of the fuselage 12 (roll).

Aircraft 10 is powered by an engine 24 which is mounted to the fuselage 12 adjacent to the wing 16. Engine 24 delivers thrust for the rear of the aircraft 10 for the purpose of propelling the aircraft 10 through the air. Engines 24 can be jet engines which are mounted in a conventional manner to the aircraft 12.

Importantly, in the present invention, a thruster 26 is supported on the wing 16. Thruster 26 serves to deliver a thrust of air at an angle toward an area directly below the fuselage 12. The thruster 26, as will be described hereinafter, can be angularly adjustable for the purposes of proper take-off and landing.

Figure 2:
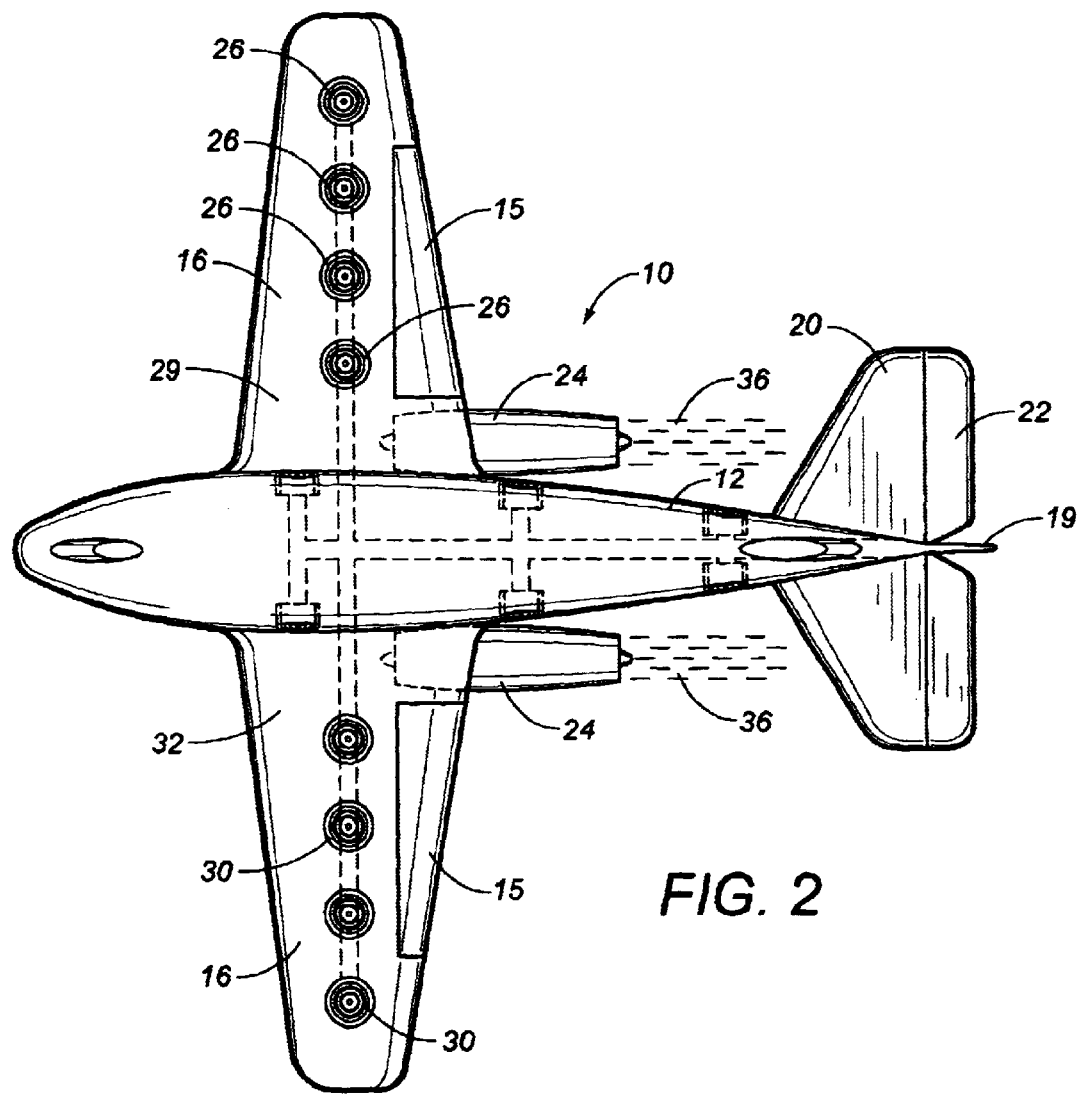
FIG. 2 is a bottom view showing the VTOL aircraft in accordance with the teachings of the present invention.

FIG. 2 shows an underside of the aircraft 10. As can be seen, the first thruster 26 is mounted on the wing 16. A second thruster 30 is mounted to the wing 32. Each of the thrusters 26 and 30 are respectively mounted in front of the ailerons 15 and 34. The jet engines 24 are positioned so as to deliver thrust 36 rearwardly of the aircraft. The configuration of the ailerons 15 and the rudders 22 are shown in greater detail in FIG. 2.

Figure 3:
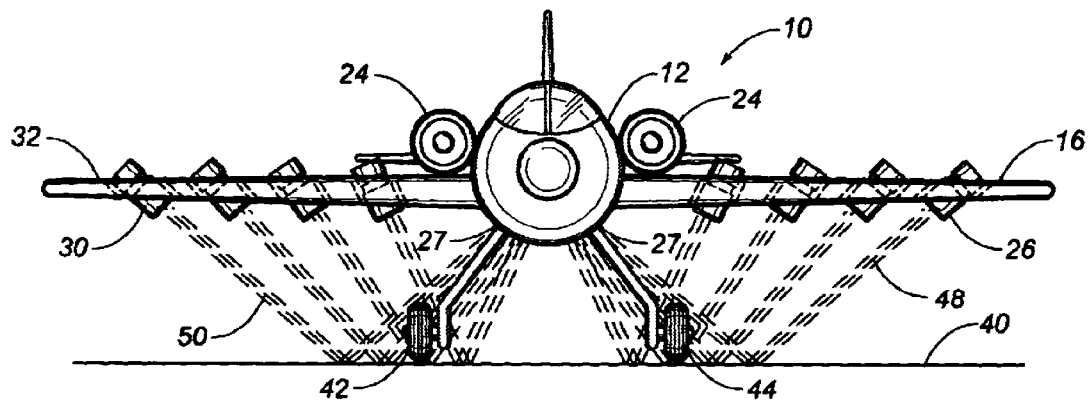
FIG. 3 is a frontal view of the aircraft in accordance with the teachings of the present invention showing, in particular, the technique for landing the aircraft.

FIG. 3 shows a forward view of the aircraft 10. As can be seen in FIG. 3, the thrusters 26 and 30 are shown as directed at an acute angle with respect to wings 16 and 32 so as to facilitate the landing of the aircraft 10 on the earth 40. In FIG. 3, it can be seen that the aircraft 10 has fuselage 12 with wheels 42 and 44 extending downwardly therefrom. Engines 24 are positioned on opposite sides of the fuselage 12. The engines 26 and 30 are shown in the form of jet engines which are angled so as to direct the thrust 48 from thruster 26 angularly downwardly to an area of the earth 40 directly below the fuselage 12. Similarly, the second thruster 30 directs its thrust 50 downwardly at an angle so as to contact the earth 40 directly below the fuselage 12. The thrust will rebound from the earth 40 upwardly so as to provide a "cushion" for the landing of the aircraft 10. By angling the thrusters 26 and 30 inwardly, in the manner shown in FIG. 3, the aircraft 10 can easily land in a manner similar to that of a bird.

During landing, a very strong amount of thrust 48 and 50 can be applied toward the earth 40. As the aircraft 10 approaches the earth 40, the thrust from the thrusters 26 and 30 can be suitably reduced. When the wheels 42 and 44 contact the earth 40, the thrust from the thrusters 26 and 30 can be stopped so as to allow the aircraft 10 to properly land on the earth 40.

Figure 4:
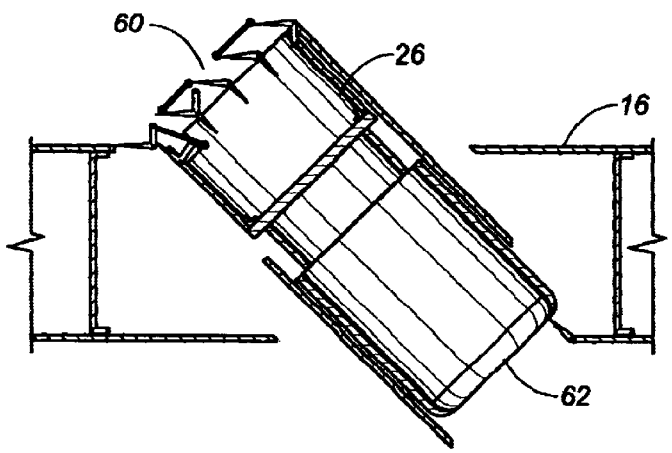
FIG. 4 is a cross-sectional view showing the structure of the thruster of the present invention as shown at an angle suitable for landing.

FIG. 4 shows the thruster 26 in accordance with the teachings of the present invention. Thruster 26 is mounted within the structure of wings 16. Suitable engine mechanisms and control mechanisms can be provided in a conventional manner so that the thruster 26 will work properly in the nature of a conventional engine. The thruster 26 has an intake 60 and an outlet 62. The thrust will be passed outwardly of the outlet 62. It can be seen in FIG. 4 that the thruster 26 has a longitudinal axis arranged at an acute angle with respect to the wing structure 16.

Figure 5:
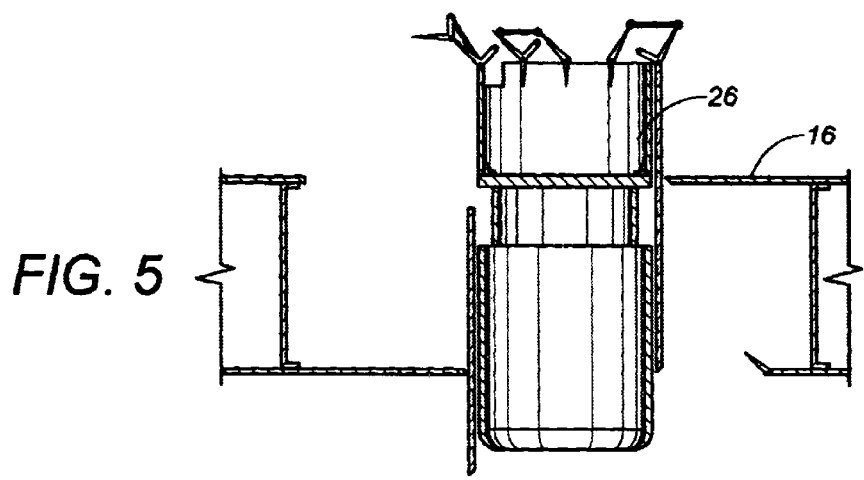
FIG. 5 shows a thruster of the present invention at an angle suitable for take-off.

In the present invention, the angular relationship between the thruster 26 and the wing structure 16 can be suitably manipulated by a control mechanism within the fuselage 12. In FIG. 5, it can be seen that the thruster 26 has a longitudinal axis which is vertical to the wing structure 16. As a result, the pilot within the fuselage 12 can suitably adjust the angle of the thruster 26 with respect to the wing structure 16 so as to facilitate take-off and landing. When the structure 26 is in its vertical orientation, as shown in FIG. 5, the aircraft 10 is in a proper condition for take-off. When the thruster 26 is in its angular relationship to the wing 16, the aircraft 10 is in a suitable arrangement for landing. Additionally, the pilot within the fuselage 12 can control the amount of thrust emitted by the thruster 26. Ultimately, the control system in the aircraft 12 will move each of the thrusters 26 and 30 in coordination so as to create an even and balanced thrust from the thrusters 26 and 30.

The foregoing disclosure and description of the invention is illustrative and explanatory thereof. Various changes in the details of the in the steps of the described method can be made within the scope of the present invention without departing from the true spirit of the claims. The present invention should only be limited by the following claims and their legal equivalents.

I claim:

1. A VTOL aircraft comprising:

a fuselage;

a first wing extending from one side of said fuselage;

a second wing extending from an opposite side of said fuselage;

a first thruster means for directing a thrust of air at an angle directly below said fuselage, said first thruster means being a first jet engine supported on said first wing, said first jet engine being angularly moveable between a first position and a second position, said first position being directed to an area directly below said fuselage, said second position being transverse to a plane of said first and second wings;

a second thruster means for directing a thrust of air of an angel toward an area directly below said fuselage, said second thruster means being a second jet engine supported on said second wing, said second jet engine being angularly moveable between a first position and a second position, said first position being directed to an area directly below said fuselage, said second position being transverse to a plane of said first and second wings; and a propulsion means connected to said fuselage, said propulsion means for generating thrust so as to propel said fuselage, said propulsion means being separate from said first and second thruster means.

2. The aircraft of claim 1, each said first and second jet engines having a selectable amount of thrust.

3. The aircraft of claim 1, said propulsion means being a pair of jet engines mounted on opposite sides of said fuselage such that a thrust therefrom is parallel to a longitudinal axis of said fuselage.

4. The aircraft of claim 1, further comprising:
control means contained in said fuselage, said control means connected to said first and second thruster means, said control means for controlling an amount of the thrust produced by said first and second thruster means.

5. The aircraft of claim 4, said control means for controlling the angle of the thrust.

6. A VTOL aircraft comprising:
a fuselage;
a first wing extending from one side of said fuselage;
a second wing extending from an opposite side of said fuselage;
a first thruster means supported on said first wing, said first thruster means for directing a thrust of air at an adjustable angle between vertical and an angle toward an area directly below said fuselage; and
a second thruster means supported on said second wing, said second thruster means for directing a thrust of air at an adjustable angle between vertical and an angle directed toward the area directly below said fuselage, each of said first and second thruster means being a jet engine having an inlet positioned within an area of a top surface of the wing.

7. The aircraft of claim 6, further comprising:
propulsion means connected to said fuselage, said propulsion means for generating thrust so as to propel said fuselage, the thrust of said propulsion means being parallel to a longitudinal axis of said fuselage.

8. The aircraft of claim 7, said propulsion means being a pair of jet engines mounted on opposite sides of said fuselage.

9. The aircraft of claim 6, further comprising:
control means contained in said fuselage, said control means connected to said first and second thruster means, said control means for controlling an amount of the thrust produced by said first and second thruster means.

10. The aircraft of claim 9, said control means for controlling the angle of the thrust and the force of the thrust.

11. The aircraft of claim 10, said control means for moving each of said first and second thruster means in coordination with each other.

12. A method of landing an aircraft comprising:
flying the aircraft toward a surface of the earth;
directing a downward thrust from a pair of wings of said aircraft toward the earth in an area directly below a fuselage of the aircraft;
reducing a force of said downward thrust as said aircraft approaches the earth; and
stopping said downward thrust when wheels of the aircraft touch the earth.

13. The method of claim 12, further comprising:
forming the aircraft so as to have a first thruster on one of said pair of wings and a second thruster on the other of said pair of wings, said first and second thrusters being angularly adjustable.

14. The method of claim 13, further comprising:
angularly adjusting said first and second thrusters so as to move from a vertical orientation to an acute angle with respect to said first and second wings prior to said step of directing the downward force.

15. The method of claim 14, said step of angularly adjusting comprising moving said first and second thrusters in even coordination.

* * * * *